United States Patent [19]

Roesel, Jr.

[11] 4,406,950
[45] Sep. 27, 1983

[54] GREATLY PROLONGED PERIOD NON-INTERRUPTIBLE POWER SUPPLY SYSTEM

[75] Inventor: John F. Roesel, Jr., Bradenton, Fla.

[73] Assignee: Precise Power Corporation, Bradenton, Fla.

[21] Appl. No.: 280,604

[22] Filed: Jul. 6, 1981

[51] Int. Cl.³ .............................................. H02J 9/06
[52] U.S. Cl. .................................... 290/4 C; 307/68; 322/4
[58] Field of Search ...................... 290/4 R, 4 B, 4 C; 307/64, 65, 67, 68; 322/29, 47, 4

[56] References Cited

U.S. PATENT DOCUMENTS

| | | | |
|---|---|---|---|
| 2,783,393 | 2/1957 | Lindahl et al. | 290/4 R X |
| 3,315,148 | 4/1967 | Grillo | 290/4 R X |
| 3,514,625 | 5/1970 | Lane | 307/67 |
| 3,558,901 | 1/1971 | Jacobus | 290/4 X |
| 4,168,459 | 9/1979 | Roesel, Jr. | 322/29 |
| 4,203,041 | 5/1980 | Sachs | 307/67 |

*Primary Examiner*—J. V. Truhe
*Assistant Examiner*—W. E. Duncanson, Jr.
*Attorney, Agent, or Firm*—Frederick Shapoe

[57] ABSTRACT

This invention relates to a power supply system having the capability of furnishing to a load sensitive to electrical faults and interruptions, electrical power for prolonged periods of time after a utility or other external power supply source thereto is interrupted. The system comprises a main A.C. generator furnishing A.C. potential at a selected frequency and a selected voltage to the sensitive load, an auxiliary A.C. generator connected operatively thereto and a driving means for the generators energized with electricity from the external power supply source which is subject to outages and faults. The auxiliary generator generates A.C. potential at a much higher frequency than from the main A.C. generator and this higher frequency A.C. is supplied to a high speed A.C. induction motor and a flywheel unit in a sealed chamber, which unit can store large amounts of kinetic energy at full speed. Upon interruption of electricity from the utility or other external power source, the high speed A.C. induction motor in the sealed casing will function as a generator and feed back A.C. potential to the auxiliary generator which begins to operate as a motor and drives the main A.C. generator. A relatively small A.C. motor and flywheel unit can store and supply power to keep the main A.C. generator operating for from 1 to 20 minutes so as to ride out practically all reasonably expected power line outages. Particularly good results are obtained if the main A.C. generator is the Roesel generator of U.S. Pat. No. 4,168,459.

6 Claims, 1 Drawing Figure

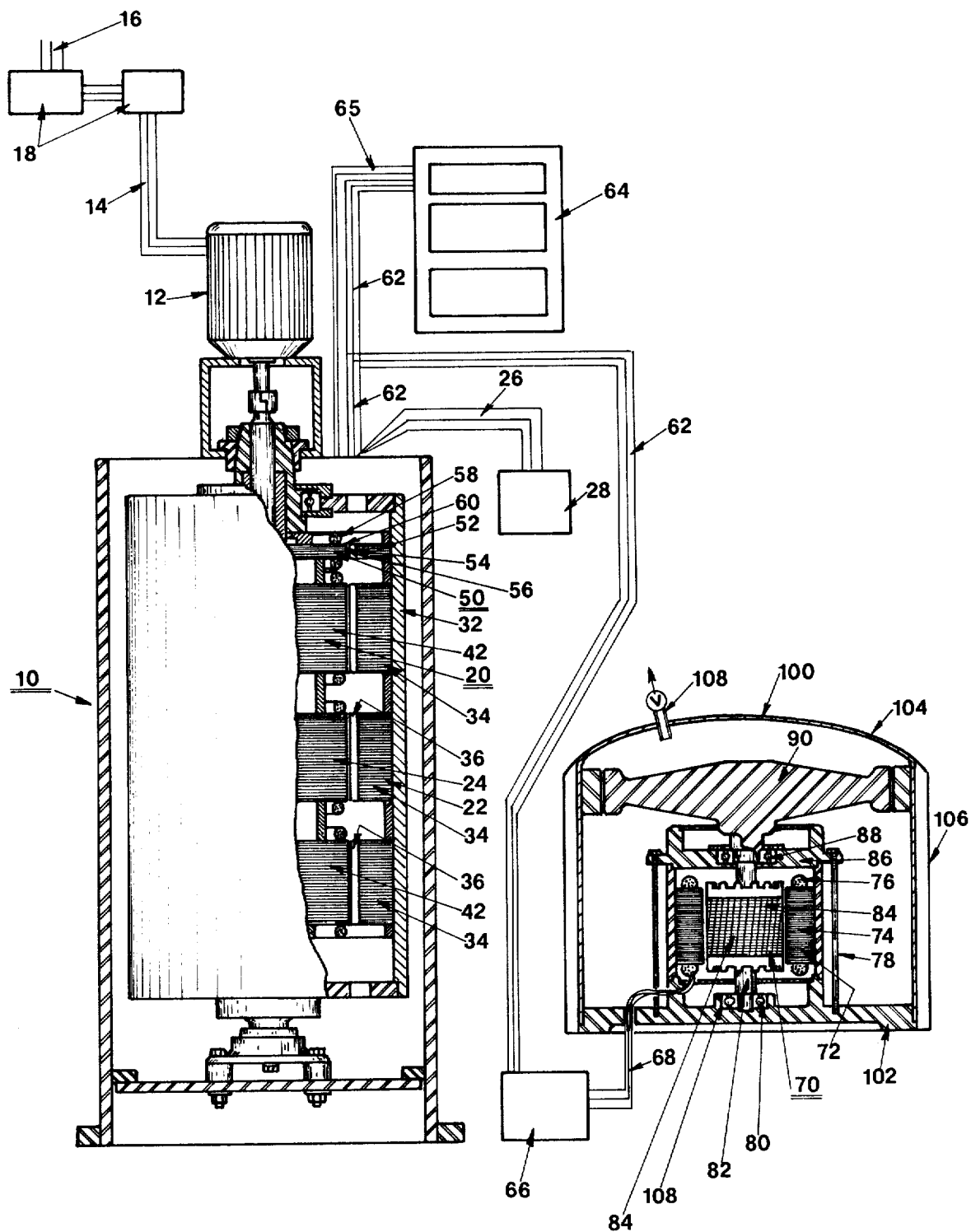

GREATLY PROLONGED PERIOD NON-INTERRUPTIBLE POWER SUPPLY SYSTEM

CROSS-REFERENCE TO RELATED APPLICATION

This application is related to a copending patent application No. 279,880 filed July 2, 1981, entitled: "Motor-Generator System Providing Prolonged Uninterrupted Power Supply To A Load" and in which the inventor is the same as in the present invention.

PRIOR ART

It is known to provide somewhat complex and expensive electrical generator systems employing flywheels to overcome brief faults and irregularities in supply power lines to the motors driving such generators, so that loads sensitive to such power line faults may be supplied electrical potential free of interruptions and irregularities. Usually, however, such systems supply electrical power for only a matter of seconds and, at best, less than a minute.

A search of the prior art has located the following patents and publications which are believed to be the most pertinent known to applicant respecting the present invention.

1. Gaul, U.S. Pat. No. 3,609,426 issued Sept. 28, 1971, entitled "Inertia-driven Standby Electrical Generator Unit", discloses several different modifications in each of which the essential feature comprises a standby generator or alternator with two flywheels, of which the first is fixedly joined to the alternator, while the second flywheel is coupled to an electrically controlled slip clutch. A two speed motor is used to drive the alternator and the first flywheel to a normal speed, and then the motor is run at its higher speed to bring the second flywheel to twice the speed of the first flywheel. When an electrical interruption in the power line to the load occurs, the standby alternator is cut into the line to the load with the kinetic energy of the alternator and the first flysheel supplying the power to generate A.C. potential. The magnetic slip clutch is energized by its electrical controls to let the higher speed second flywheel supply just enough added energy to keep the alternator turning at a constant speed for a short time so that the voltage remains constant. On column 3, lines 30 to 32, the patentee indicates that the second flywheel can keep the alternator functioning properly for some 5 to 10 seconds.

2. Grillo, U.S. Pat. No. 3,315,148 issued Apr. 18, 1967, entitled "A. C. Generator Power Supply", discloses a motor-generator unit that takes power from an electrical utility line to run the motor driving the generator to supply electrical power to a load sensitive to power line faults and interruptions, particularly computers, and thereby isolate the computer from the utility line. In order to handle line faults of up to about one second—see column 1, lines 30 to 36—the motor generator has a flywheel connected to it by a magnetically operated clutch to enable the generator to supply electrical potential to the computer. If the power line fault exceeds a second, as indicated in column 6, lines 39 to 46 and lines 63 to 65, electrical controls are energized to cycle down the computer. If a fault is corrected in less than a second, the line power is restored and the motor-generator is brought up to speed first and the electromagnetic clutch is then energized to have the flywheel brought up to full speed.

3. Lindahl et al, U.S. Pat. No. 2,783,393 issued Feb. 26, 1957 entitled "Apparatus for Emergency Power Transfer", discloses four modifications of apparatus for effecting emergency transfer of power upon failure of a utility power line to a standby unit in order to supply a load that cannot tolerate an interruption. In each modification, there is employed a combined D.C. generator-motor unit with a heavy flywheel and a rotary converter which receives the D.C. from the generator and converts it to A.C. for the load. The flywheel supplies sufficient energy to the D.C. generator to enable it to produce electrical voltage when the utility line is interrupted so that the load can be supplied A.C. power for some seconds until an auxiliary diesel engine can be started and thus drive the D.C. generator. As is well known, the D.C. generator and the rotary converter contain commutators and brushes which require maintenance.

4. Article entitled "Flywheels in Space" on pages 86 and 87 of the August 1980 issue of Popular Science magazine, describes a magnetically suspended brushless motor and a flywheel disposed in an evacuated sealed casing which motor is energized to a high speed and when electrical power is needed the flywheel and motor are electronically operated to generate electrical potential.

In spite of the many components in the apparatus of the three patents above listed, the switches, regulators, magnetic clutches, controls and other electrical members, the brushes and commutators in some devices which require continual care and maintenance, the effective capabilities in response to an interruption in the utility power line are of the order of seconds and at most do not exceed about 20 seconds. By contrast, the present invention provides a relatively simple and comparatively small A.C. induction motor and a flywheel which is coupled to an auxiliary high frequency A.C. generator supplying A.C. power to a sensitive load. The auxiliary A.C. generator functions as a motor while the A.C. induction motor automatically becomes a high frequency A.C. generator when the utility line supplying power to a motor driving the main A.C. generator is interrupted. The system has a very long life and requires little if any, maintenance. This novel system will provide electrical power to a load for as much as 20 minutes or more, so that it can ride out all reasonably expected utility power line faults and interruptions except the rare hour or days long interruptions.

The present invention is particularly useful when it combines the A.C. induction motor and flywheel in the sealed chamber with the Roesel constant frequency constant voltage generator as is disclosed in U.S. Pat. Nos. 4,168,459 issued Sept. 18, 1979 and 3,521,149 issued July 21, 1970, and the disclosures of these patents are incorporated herein.

BACKGROUND OF THE INVENTION

For many applications it is desirable and, in fact, necessary to provide A.C. electrical power with a relatively constant voltage and frequency and without any interruptions. Hospitals, electronic data processing installations, radio and television stations, police communication facilities, airport communication and control tower directing facilities, and military installations are examples of electrical users that are critically affected when their A.C. power lines fail or when the voltage and/or frequency drop below or increase above certain relatively narrow limits. Their electrical equipment can misfunction or malfunction when any of these power line faults occur, and serious loss or damage may take place, and in some cases, lives may be jeopardized.

While public utility power systems are regarded as being quite reliable, they do have problems comprising electrical irregularities and failures. Public utility A.C. power lines are subject to numerous brief electrical surges, dips, transients and other faults, while major longer time faults and interruptions occur though less frequently and prolonged complete power failures arise occasionally. Details of such power system faults are given in the following literature: "Focus on Uninterruptible Power Supplies and Inverters" appearing on pages 100 to 107 of the May 10, 1975 issue of "Electronic Design"; "Power Protection Equipment" on pages 38 to 43 of the July 1977 issue of "Mini-Micro Systems" magazine; and "There's a Time and Place for UPS" on pages 39, 42, 43, 46 and 47 of the August 1979 issue of "Infosystems".

Briefly, in the period of a year, on an average there may be thousands of electrical irregularities such as voltage surfaces, dips, and transients lasting only a few milliseconds in any given power line. Annually, there may be hundreds of voltage and frequency drops lasting a few cycles and not exceeding about a 25% voltage drop, and up to about 10 complete outages or major line failures where the voltage drops 75% or more, with each outage lasting not more than about 15 minutes or so. Excluding deliberate blackouts or brownouts by the public utility operators in cases of excessive power demands, at rare intervals of perhaps one every year or two on the average, the damaging results of hurricanes, major sleet and wind storms, accidents in or to substations and power plants, fires and so on, can cause utility line interruptions lasting for hours or days.

It would be highly desirable to isolate or insulate loads sensitive to power line faults, irregularities and brief interruption lasting up to about 15 minutes, so that a steady input of electrical A.C. power at a selected voltage and frequency can be supplied regardless of what happens to the utility power line. Desirably, the equipment for so isolating or insulating the load from the power line should be reliable, efficient, of relatively low cost, require small space and need little maintenance, and should be effective to furnish the A.C. power for a period of time of the order of up to 20 minutes when the power line is completely interrupted. This will take care of practically all the normally expected power line problems. For critical facilities where standby generators with an engine are provided, these can be started easily in such to furnish power for the rare instances of hour or day long power outages. The present invention is provided to meet these parameters.

SUMMARY OF THE INVENTION

A rotatable A.C. generator system is provided wherein there is a main A.C. generator for producing a main A.C. potential at a desired voltage and frequency while rotating at a speed within a given RPM range, usually 60 or 50 Hz being the desired frequency, and an auxiliary A.C. generator connected to the main A.C. generator to produce a secondary A.C. potential at a much higher frequency than the main A.C., at least about 3 times higher, and preferably in the range of 5 to 20 times higher.

The main and auxiliary generators are rotated by a driving means such as an A.C. induction motor, energizable from a suitable power source such as a utility power line. As previously mentioned, the power source is subject to faults and occasional total interruptions that may last from a few cycles up to a few seconds or for minutes. The comined rotational inertia or kinetic energy of the two generators and the A.C. motor driving means will usually be sufficient for the main A.C. generator to produce a usable main A.C. potential output for up to some seconds of time since the speed of rotation will be in the given RPM range, and thus minor faults and very brief line power interruptions will not significantly affect the main A.C. potential output to the electrical equipment being powered.

Where the electrical load for the main A.C. potential comprises equipment sensitive to frequency and voltage changes, the Roesel generator shown and described in U.S. Pat. No. 4,168,459 issued Sept. 18, 1979 can be used for the main and auxiliary A.C. generators and the voltage and frequency of the main A.C. will remain constant regardless of the variation in speed of the main A.C. generator until the speed drops to about 70% or so of the normal speed.

In order to keep the main A.C. generator operating in the given RPM range for prolonged periods of from 1 to 20 minutes or more, in cases where the line power is interrupted for such periods of time, there is provided a sealed chamber having either an atmosphere of hydrogen or a vacuum, in which is disposed a high speed A.C. induction motor and a connected flywheel. The A.C. induction motor is energized with the high frequency A.C. from the auxiliary generator. If the main A.C. generator is a 4-pole unit and rotates at 1800 RPM it will generate 60 Hz A.C., while the auxiliary A.C. generator may be a 40 pole unit which at 1800 RPM will produce 600 Hz A.C. which applied to a 4-pole A.C. induction motor in the sealed chamber will cause it to rotate at 18,000 RPM. At this speed, the A.C. induction motor and flywheel may be relatively small and yet will store large amounts of rotational kinetic energy.

The A.C. induction motor in the sealed chamber will ordinarily have no load except for windage and frictional losses, and will rotate at a speed synchronous with, or slightly below synchronous, with the frequency of the A.C. from the auxiliary generator. Very little A.C. power will flow to it from the auxiliary generator once the high speed A.C. induction motor reaches its full speed. However when a power supply line fault or interruption occurs so that the driving means ceases to drive the main A.C. and auxiliary A.C. generators, their speed will rapidly drop as their rotational kinetic energy is used up in producing A.C. potential to the load. Concurrently with the drop in rotational speed, the frequency of the A.C. output from the auxiliary generator will drop below its synchronous relationship with that of the high speed A.C. induction motor. When this occurs, the A.C. induction motor will automatically function as an A.C. generator and will feed back high frequency A.C. immediately to the auxiliary generator which will automatically function as an A.C. synchronous motor and drive the main A.C. generator. Because of the large amounts of rotational kinetic energy stored in the high speed A.C. induction motor and its associated flywheel, the main A.C. generator will be driven by the auxiliary generator functioning as a motor for an extended period of time within the given RPM range.

Electrical controls are provided to connect the driving means to the utility or other power supply line, and to disconnect the driving motor therefrom in the event of a fault or outage so that the motor does not feed back electricity and to prevent damage in case excessive voltage surges or the like occur. Electrical controls may be provided to bring the system into operation in a desired sequence from a dead start. For most cases, the system will be put into operation by initially energizing the main driving motor from the power line so as to bring the two A.C. generators up to full normal speed of, for example 1800 RPM for a 4 pole machine to generate 60 Hz A.C. output, and the auxiliary A.C. generator will supply no A.C. to the high speed A.C. motor in the sealed chamber until the main A.C. generator is producing full A.C. potential at 60 Hz to the load. At this time the line to the high speed A.C. motor is activated so that 600 Hz A.C. from the auxiliary generator flows to the motor. Depending on the size of the high speed motor and flywheel, it may require a considerable period of up to an hour to bring the high speed A.C. motor to its full speed of 18,000 RPM. In order to avoid over heating the A.C. motor the controls are set to energize it gradually with a slow acceleration of the rotor speed.

DESCRIPTION OF THE DRAWINGS

The single FIGURE of the drawing is a schematic view, partly in section, of one embodiment of the invention.

DETAILED DESCRIPTION OF THE INVENTION

Referring to the FIGURE of the drawing there is shown schematically the non-interruptible A.C. electrical power generating system having a greatly prolonged period of electrical A.C. potential output after external power thereto ceases. The generating system comprises the unit 10 comprising a motor 12 driving both a rotatable main A.C. generator 20 and an auxiliary A.C. generator 50. The motor 12 which may be an A.C. induction motor or a synchronous motor, is supplied electrical power, for example 3-phase A.C., by a line 14 connected to a public utility transmission line or network 16 which last is subject to interruptions, faults and irregularities as described earlier. A circuit breaker, motor starter, and other controls 18 are provided in the line 14 to connect the motor 12 to the line 16 and to disconnect it in the event of a power line failure or a major fault. It will be understood that fuses, lightning arrestors and other safety and control means may be provided in the line 14.

The drive shaft of motor 12 is operatively connected to rotate the main A.C. generator 20 and the auxiliary A.C. generator 50. As shown, the shafts of the motor 12, generator 20 and auxiliary generator 50 are connected together and are in line. Belt drives may be used to have the motor drive the generators. The main A.C. generator 20 comprises a rotating field 22 which surrounds a stationary armature 24 having windings that generate a main A.C. potential that is carried by line 26 to a load 28 sensitive to electrical faults, irregularities and interruptions. Each specific load has certain voltage and frequency tolerances and as long as line 26 supplies A.C. potential within such tolerance limits, the load will function as desired. Usually, however, complete electrical interruptions cannot be tolerated. The main generator 20 will produce an A.C. potential output within the tolerances required by the load as long as it is rotating in a given RPM range. If the external power line 16 has an interruption, the motor 12 will cease to furnish driving power to generator 20 and the kinetic energy of the rotational speed of the rotor will keep the main generator producing only for a short period the proper A.C. potential to be supplied to the load. However the speed of the rotors of both the main generator 20 and the auxiliary generator 50 will rapidly decrease as their rotational energy is converted to the A.C. potential.

If the main A.C. generator is a conventional type unit the frequency and voltage of the A.C. potential produced is usually directly proportional to the rotational speed. A 4 pole A.C. generator at a speed of 1800 RPM will generate 60 Hz A.C. potential at a designed voltage. At a 10% speed reduction the generator will generate A.C. of 54 Hz and the voltage also will be reduced 10%. While some loads will operate with a voltage and frequency reduction of this amount, a few loads will even operate reasonably satisfactorily at somewhat greater reductions. However, many critical loads such as computers can tolerate only a 0.5% frequency change, therefore quite often frequency is more critical than voltage. In any event the rotational kinetic energy of the rotating mass of the generators will be effective for only a matter of about a second in generating A.C. potential of an acceptable voltage and frequency for practically all sensitive loads. Even with a very heavy flywheel any practical generator will cease to generate A.C. potentials at a voltage and frequency acceptable to an average sensitive load in about 1 to 10 seconds.

By employing the Roesel A.C. generator as shown in FIGS. 1 and 6 and as described in U.S. Pat. No. 4,168,459 as the generator 20 in the system of the present invention, the main generator will produce A.C. potentials of a substantially constant voltage and frequency even though the rotor speed drops by 30%. Thus any load will be supplied the same voltage and frequency A.C. potential for 15 seconds or more after the driving motor ceases to receive electrical power from the line 16, and the load will operate without interruption. However, after such period the kinetic energy of the sharply reduced speed of the rotating mass will not be able to generate the desired A.C. potential. In order to prolong greatly the effective output of A.C. potential from the generator, the system of the present invention has been devised.

As shown in the drawing, the Roesel generator of FIG. 1 of U.S. Pat. No. 4,168,459 is employed for the generators 20 and 50. The rotor 22 of the generator comprises a cylindrical shell 32 to which are affixed three field cores 34, when three phase A.C. output is desired, each field core comprises soft magnetic material of high permeability, such as laminations of 3% silicon steel, with a large central cylindrical aperture in each field core. On the face of each cylindrical aperture is applied a layer 36 of magnetizable permanent magnetic material such as strontium ferrite or barrium ferrite, with the exposed face of the layer 36 being of circular cylindrical shape which is coaxial with the axis of rotation of the shell 32 and the field cores 34. The fixed armature 24 passes through the circular aperture in the field cores and comprises three armature cores 42 of soft magnetic material of high permeability, such as 3% silicon steel, with slots therein. The outer face of each armature core is of circular cylindrical shape aligned with one field core 34 of the rotor and located in juxtaposition with the layer 36 with a small clearance therebetween. In each armature core there are adjacent slots in which an exciting winding or coil is placed and the core portion between the two slots forms a pole piece so that when an alternating current is passed through the exciting coil the pole piece develops a strong alternating magnetic field that will indice north and south magnetic poles in the layer 36 of magnetizable magnetic material when the rotor 22 revolves about the armature 24. These north and south magnetic poles in layer 36 are in a pattern or configuration dependent upon the frequency of the alternating current passing through the exciting coil and the remanent flux strength of the magnetic poles is dependent upon the magnetic flux in the pole piece, up to the maximum flux that the particular magnetic material used in layer 36 will attain.

In other slots in the armature core are disposed power potential generating windings which will generate A.C. potential as the layer 36 magnetized into a pattern of north and south magnetic poles rotates about the armature 24. The frequency and voltage of the A.C. potential generated in these potential generating windings will depend upon the remanent magnetic flux and the pattern of the north and south magnetic poles in the layer 36. As disclosed in detail in U.S. Pat. No. 4,168,459, there may be other windings in other slots of the armature cores 42, namely (1) modifying windings to control or modify the remanent flux density in layer 36, (2) supplementing windings to generate A.C. potential to be supplied to the exciting winding, and (3) leading and/or lagging windings to furnish A.C. potentials that may be combined with the A.C. potentials generated in the first mentioned potential generating windings in order to improve the total harmonic distortion and power capacity thereof.

The auxiliary generator 50 comprises a rotating field core 52 affixed to the cylindrical shell 32, the core comprising a body of soft magnetic material of high permeability having a circular cylindrical central aperture coaxial with the apertures of the field cores 34, and a layer 54 of permanent magnet material magnetized into a permanent pattern of north and south magnetic poles, the layer 54 presenting an essentially cylindrical exposed face 56 coaxial with the axis of rotation. A slotted armature core 58 of soft magnetic material of high permeability, for example laminations of 3% silicon steel, is affixed to the armature 24 and has an outer cylindrical face closely spaced from the face 56 and operatively juxtaposed thereto. Windings 60 are placed in the slots of core 58 and will generate A.C. potentials when the field core 52 rotates with respect thereto. The number of north and south magnetic poles in layer 54 and the number of windings in the slots of the armature core 58 are so correlated that the A.C. potential produced has a frequency many times that of the frequency of the A.C. potential generated in the windings of the armature core 42, and for the purpose of this invention should be about at least 3 times greater, and preferably from 10 to 20 times greater. Thus if the main generator produces A.C. of 60 Hz, then the auxiliary generator should produce A.C. of at least about 180 to 300 Hz, and preferably from about 600 to 1200 Hz.

The high frequency A.C. potential produced by the auxiliary generator 50 may be single phase but is preferably polyphase. Conducting line 62 carries a portion of the high frequency A.C. potential from auxiliary generator 50 to a power supply and control unit 64 which produces an A.C. potential corresponding to the desired frequency of the potential to be generated by the main generator 20. Suitable electrical control means for this purpose are shown in FIGS. 3, 3A, 4 and 7 of U.S. Pat. No. 4,168,459, and described in that portion therein extending from line 32 of column 13 to line 42 of column 17. Line 65 carries this A.C. potential to the exciting coils.

Some of the high frequency A.C. potential in line 62 is supplied to a control unit 66 which conveys at suitable times the electrical power through line 68 to a high speed A.C. motor 70 disposed in a sealed chamber 100 which may be hydrogen filled or filled with other low density gas or evacuated. The A.C. motor comprises a stator 72 having a core 74 of soft magnetic material with windings 76 energizable with the high frequency A.C. potential from line 68 to provide a rotatable magnetic field as is well known. The sealed chamber 100 comprises a rugged base 102 to which the motor stator 72 is firmly attached with bolts 78 so that a good thermally conductive contact is had whereby heat developed in the stator is easily conveyed to the base and then flows to the walls 104 and is ultimately dissipated to the ambient by fins 106 on the exterior walls of the chamber. Base 102 has a support recess 108 to receive one bearing 80 at the lower end of shaft 82 of the motor rotor 84, which rotor may be of the common squirrel cage construction for induction motors. An upper motor end bell 86 contains a bearing 88 to receive the upper end of shaft 82. Affixed to the upper end of shaft 82 is a durably constructed, relatively small flywheel 90. Heat generated in the rotor 84 during operation is conducted by shaft 82 to flywheel 90 from whose surface it is radiated to the walls of the chamber 100, when the chamber is evacuated. If hydrogen gas atmosphere is present in the chamber 100, then the gas will convey heat efficiently from the rotor.

The materials and construction of the flywheel 90 should be such as to withstand safely the substantial centrifugal forces developed at extremely high speeds of its rotation. The flywheel may be of forged steel construction with an enlarged hub tapering to an outer flanged rim portion.

For vacuum operation, the bearings 80 and 88 may be lubricated with a solid lubricant such as molybdenum disulphide, tantalum disulphide, or niobium disulphide, or the selenides or tellurides of these metals, or certain low vapor pressure lubricants known in the art.

The chamber 100 may be evacuated through a pipe 108 to a desired low pressure of, for example one millimeter of mercury, in order to reduce windage losses when the motor 70 and flywheel 90 are at full speed. the end of the pipe 108 may be provided with a vacuum tight valve, or it may be sealed. If a hydrogen, or other low density gas, is to be used in chamber 100, the chamber is first evacuated to a low pressure and then hydrogen gas is introduced by pipe 108 to a desired pressure. A gas pressure guage may be provided in the chamber 100, with any leads or the like passing through the walls by means of a glass to metal hermetic seal A glass to metal seal is also provided to enable electrical line 68 to enter chamber 100.

The high speed A.C. motor and its associated flywheel can store large amounts of rotational kinetic energy in a relatively small space. Thus a steel flywheel of 24 inches in diameter having an outer rim of a thickness of three inches and increasing gradually to a hub of six inches in depth, will store some five kilowatt hours of energy at a speed of 18,000 RPM. In going from 18,000 to 12,000 RPM, the flywheel will release some 55% of this energy. To contain a flywheel of this size and an available A.C. induction motor, the chamber 100 may be about 26 inches in diameter and of a height of some 15 to 18 inches.

In one sequence for initiating the operation of the apparatus system of the drawing, the circuit breaker 18 is operated to close the circuit to power line 16 and the motor 12 is started to bring the main and auxiliary A.C. generators 20 and 50 up to normal full speed. The control 66 will be set so that no electrical energy initially goes to the high speed motor 70. After a brief period, the motor 12 will have brought the generators 20 and 50 to full speed and the output of the main generator will be, for example, 60 Hz A.C. which will be conveyed to load 28. The auxiliary generator 50, may be a 40-pole unit and at 1800 RPM will be generating 600 Hz A.C. which will be supplied to the power and control unit 64 which will be supplying 60 Hz A.C. to the exciting coil so that the layer 36 will be magnetized in a pattern enabling the main A.C. generator to produce 60 Hz. A.C. At this time, the control unit will be caused to allow 600 A.C. to flow to conductor line 68 and thence to motor 70 in the sealed chamber. The flow of A.C. power to the motor 70 may be controlled so as to accelerate the motor slowly in order to avoid overheating. Because of the inertia of the motor and flywheel, it may require a period of the order of an hour before they reach their full speed of, for example, 18,000 RPM. Once full speed, which is synchronous with the high frequency A.C. from generator 50, is reached the motor 70 will float on the circuit, and since windage and other losses are low, very little energy will need to be supplied by auxiliary generator 50 to the motor.

If an interruption in the line 16 occurs so that no electrical power flows to motor 12, the circuit breaker and its associated controls will be operated to break the circuit to the motor. Since the motor 12 is no longer able to supply power to drive the rotors of generators 20 and 50, at for example 1800 RPM, the rotational kinetic energy of the rotors of the generators 20 and 50 will be used to keep on generating A.C. potential output. In doing so the rotor speed will drop in proportion to the amount of energy being converted. However, the main A.C. generator will continue to generate 60 Hz A.C. potential and at the specified voltage regardless of the speed of its rotor 22 until the speed falls more than about 30%. The frequency of the A.C. of the auxiliary generator, however will be directly proportional to its speed and will start dropping at once. When this occurs, the high speed A.C. induction motor 70 will automatically respond the moment the frequency drops below the frequency synchronous with its speed of rotation at that moment, so that the motor will begin to function as a generator and feed back high frequency A.C. to the auxiliary generator 50 and the generator 50 will automatically begin to function as a motor and drive the main A.C. generator 20. The auxiliary generator will still generate high frequency A.C. and supply exciting current to the windings of the stator 72 sufficient to maintain an operative magnetic field so that it will function as a generator.

Because of the great amount of stored kinetic energy in the high speed motor 70 and its flywheel 90, the auxiliary generator 50 can function as a driving motor for the main A.C. generator for a prolonged period of time and keep it in its effective RPM range. It is easily possible for a relatively small A.C. induction motor and flywheel rotating at high speed to keep the main A.C. generator rotating in the effective RPM range for from 1 to 20 minutes before the desired output A.C. potential from the main A.C. generator is not being produced. By employing two or more of the high speed A.C. induction Motor and flywheel units with a single main and auxiliary A.C. generator, proportionately greater time of effective output of A.C. power from the main A.C. generator will be obtained. For example, an 8 kilowatt main A.C. generator having an auxiliary A.C. generator operatively combined with a high speed A.C. induction motor and flywheel capable of delivering about 4 kilowatt hours of stored energy before the speed drops about 30%, will keep on generating 60 Hz A.C. for more than 20 minutes at its rated capacity.

It should be understood that when utility power to a factory or office or the like is interrupted, that lighting and other equipment requiring electricity are also interrupted. The circuit 62 that conveys high frequency A.C. to the auxiliary generator 50 during power interruption on the utility line, may be used to furnish electricity for flourescent or other gas discharge lamps so that the operators can see, as well as for other necessary supporting apparatus.

The high speed motor 70 and flywheel 90 are of simple construction and require no maintenance or other special care. They will spin in the evacuated chamber for very long periods with no power coming out and very little power is needed to keep up their rotational speed.

While the drawing shows a three phase A.C. construction for the generator 20, it will be obvious to employ the single phase unit shown in FIG. 6 of U.S. Pat. No. 4,168,459 in lieu thereof where single phase A.C. is desired for the load. By providing two sets of suitable windings in the FIG. 6 modification there may be obtained two phase A.C. output.

At the present time, in order to provide uninterrupted flow of A.C. power to sensitive electronic data processors for periods of up to about 5 minutes in the event of external power line outages, there have been employed relatively complex electronic systems using solid state components, inverters, switches, transformers and the like that will react rapidly to various faults, surges and failures to suppress line surges and faults along with stacks of batteries to supply electrical power to the electronic system in case of complete external line power outages. A large mass of batteries is required to fully power these processor loads for even a 5 minute line outage. However, after such 5 minute battery drain, a battery stack will require some 4 to 8 hours to be fully recharged. By comparison, the rotating motor-generator and high speed motor flywheel system of the present invention can be effective to fully power an electronic data processing system for 5 minutes upon failure of the external power line, and upon recovery of external power the high speed motor can be brought up to full speed in a period of from about 15 to 30 minutes. Thus the present invention is available to meet a second power line outage in a short time, whereas battery systems will be unavailable for many hours. Other advantages of the present rotating component over battery and electronic systems are present.

In employing the invention, a correlation needs to be maintained between the frequency of the A.C. potential of the external power line, the rotational speed of the motor 12, and the frequency of the A.C. power required by the sensitive load 28 which A.C. must be supplied by the main generator 20, as well as the number of magnetic poles in the auxiliary generator 50 since it and the main generator are both being rotated by the motor 12, in order to produce an A.C. potential of a sufficiently high frequency to be supplied the high speed motor 70 which will have only a few even number of poles, so that it can reach a very high top speed, so as to store sufficient kinetic energy to overcome prolonged outages in the external power line. In a great number of cases, the external power line will supply either 60 Hz or 50 Hz to a four pole A.C. induction driving motor 12, which will rotate at about 1800 RPM with 60 Hz, or 1500 RPM with 50 Hz A.C. power. If the load 28 requires 60 Hz A.C. power, the exciting coils in the main generator will be supplied 60 Hz. A.C. current from control unit 64 and thereupon it will generate precisely 60 Hz A.C. output to the load 28 at either of these speeds of rotation, or any speed between as well as at speeds either moderately greater or smaller. However it is desirable, for several reasons, that when the desired output A.C. of the main generator departs from 60 Hz, that the rotational speed of the main generator be such that when the exciting coil impresses an even number of poles on the magnetic layer this causes the stator windings to produce the exact desired frequency. For example, some electrical facilities at many airports require 400 Hz A.C. power while the external power line is a 60 Hz A.C. line. By employing a 6 pole A.C. driving motor 12, its speed when energized with 60 HZ power will be 1200 RPM, and when 400 Hz A.C. current is supplied to the exciting coil the layer of permanent magnet material will be magnetized to a total of 40 poles so that 400 Hz A.C. will flow to the load. In this last example, the field core of the auxiliary generator 50 will be provided with 60 poles in the permanently magnetized magnet layer and will generate 600 Hz A.C. to power the high speed motor 70 to a full speed of 18,000 RPM. If the motor 12 were rotating at 1800 RPM then the field of the auxiliary generator need only have 40 poles in order to generate 600 Hz A.C.

The drawing shows ball or roller bearings 80 and 88 employed to rotatably support the high speed rotor 84 and flywheel 90 in the sealed chamber 100, however improved performance with reduced friction losses may be obtained if a permanent magnet suspension is applied to the upper and lower ends of shaft 82 so that the motor rotor and flywheel are suspended in a vacuum or low density gas atmosphere. Such magnetic suspension bearings are widely used as for example in watt-hour meters, and are well known. Details of one suitable magnetic bearing construction usable in practicing the present invention are set forth in the October 1979 issue of Popular Science Magazine, in an article appearing on pages 76 to 78, and entitled "Basement Flywheel".

I claim:

1. In a mechanically driven A.C. generator system capable of generating A.C. potential for a greatly prolonged period of time after external power to the driving means for the generator system fails, in combination:
    (a) a rotatable A.C. generator comprising a main A.C. generator for producing a main A.C. potential having a selected voltage and frequency while the generator is rotating within a given RPM range and a rotatable auxiliary A.C. generator operatively connected to the main A.C. generator and producing a secondary high frequency A.C. potential, the rotational kinetic energy of the main and auxiliary generators at their normal operating speed being only sufficient to enable the main A.C. generator to rotate in the given RPM range for a short period of time after the external power to the driving means fails,
    (b) driving means energizable from the external source of power to rotate the main A.C. and the auxiliary A.C. generators, the driving means ceasing to cause the generators to rotate at their normal operating speed when the external source of power fails, and
    (c) a sealed chamber containing a high speed A.C. induction motor connected to and driving a flywheel, the high speed A.C. motor being energizable with the high frequency A.C. potential from the auxiliary A.C. generator to cause it to rotate at high speed whereby large amounts of kinetic energy are stored in the motor and flywheel, windage losses being low due to a low windage loss atmosphere being present in the sealed chamber, the A.C. motor capable of functioning as a generator when the driving means ceases to operate and the main and the auxiliary A.C. generators being to slow down, so that it will generate high frequency A.C. potential by converting the stored rotational kinetic energy in the flywheel and its rotor and to supply such high frequency A.C. to the auxiliary generator which will then function as a motor to drive the main A.C. generator for a greatly prolonged time in the given RPM range.

2. The constant voltage constant frequency A.C. generator system of claim 1 wherein there are present control means interconnecting the rotatable A.C. generator, the driving means, the external source of electrical power, the A.C. induction motor and the auxiliary generator with each other so that when electrical power from the external source is available, the drive means can be energized to cuase rotation of the A.C. generator in the given RPM range and main A.C. potential at the constant voltage and frequency is generated, high frequency A.C. potential is conveyed to the A.C. induction motor from the auxiliary generator and the A.C. induction motor and its flywheel are brought up to a high speed whereby large amounts of kinetic energy are stored therein, and upon failure of the external source of electrical power, the circuit to the drive means from the external source is disconnected and the A.C. induction motor begins to function as a generator and supplies high frequency A.C. potential to the auxiliary generator which thereupon functions as a motor and drives the main A.C. generator so that its speed is maintained in the given RPM range for an extremely prolonged period of time.

3. The A.C. generator system of claim 1, wherein the main A.C. generator comprises at least one rotor field core of high permeability soft magnetic material having a surface of revolution with an affixed layer of magnetizable permanent magnetic material on such surface, and at least one stator armature relatively movable with respect to the rotor field core, the armature having a core of high permeability soft magnetic material with a complementary surface of revolution operatively juxtaposed to the permanent magnetic surface on the field core, the armature having an exciting coil with a pole piece so disposed that when the exciting coil is energized with A.C. potential the pole piece will induce in the rotating juxtaposed layer of magnetizable permanent magnetic material a selected pattern of north and south magnetic poles having a given remanent magnetic flux strength, and power output windings in the armature for generating an A.C. potential output during relative movement of the so magnetized field core to the armature.

4. The A.C. generator system of claim 1, wherein the auxiliary A.C. generator comprises a field core of high permeability soft magnetic material with a surface of revolution comprising a layer of permanent magnetic material affixed to the field core and magnetized with a predetermined pattern of north and south magnetic poles at a selected remanent magnetic field strength, and an armature comprising a core of high permeability soft magnetic material with a surface of revolution of the field core whereby to generate a high frequency A.C. potential when the field core and the armature are rotated with respect to each other.

5. The A.C. generator system of claim 1, wherein the A.C. induction motor in the evacuated chamber rotates at a speed of from about 3 to 20 times the speed of the main A.C. generator, and thr rotor and flywheel being of a size to enable storing rotational kinetic energy equal to about at least a few minutes and up to a substantial portion of an hour of the output of the main A.C. generator.

6. In a constant frequency A.C. generator system capable of generating an A.C. potential output at a substantially constant selected frequency and at a selected constant voltage, such A.C. potential being continued for a greatly prolonged period of time after normal driving power to the generator ceases, in combination, (a) a rotatable A.C. generator comprising (i) a main generator for generating a main A.C. potential output at a selected substantially constant frequency and at a selected substantially constant voltage, the main generator comprising at least one field core of high permeability soft magnetic material having a surface of revolution and a layer of magnetizable permanent magnetic material on the surface of revolution, an armature for each field core having a core of high permeability soft magnetic material with a surface of revolution complementary to the surface on the field core and operatively juxtaposed to it for relative rotational movement of the field core to the armature, the armature having an exciting coil with a pole piece so disposed that when A.C. potential energizes the exciting coil the pole piece will induce in the layer of permanent magnet material rotating with respect to it a selected pattern of north and south magnetic poles having a selected remanent magnetic flux, and power output windings in the armature for generating the main A.C. potential output during relative movement with respect thereto of the magnetically patterned layer of magnetic material in the field core, the constant frequency, constant voltage A.C. being maintained while the generator rotates within a wide given RPM range, and (ii) an auxiliary generator operatively connected to the main generator, the auxiliary generator comprising a field core of high permeability soft magnetic material with a surface of revolution having a layer of a permanent magnetic material magnetized in a predetermined pattern of north and south magnetic poles thereon and an armature of high permeability soft magnetic material having a surface of revolution complementary to the surface on the field core and operatively juxtaposed for rotation with respect thereto, and windings in the armature for generating A.C. potential generated in the main generator, the auxiliary generator capable of functioning as a motor to drive the main generator when high frequency A.C. potential is supplied to its armature windings, the rotational kinetic energy of the main generator and the auxiliary generator capable of energizing the main generator to continue producing the main A.C. potential output for only a short period of time after normal driving power to the generator ceases before its speed falls below the given RPM range, (b) drive means energizable from an external source of electrical power for normally driving both the main and the auxiliary generators, the external source of electrical power being characterized by irregularities and occasional total failure for periods of time during which the driving means will fail to supply energy to rotate the main and auxiliary generators, (c) a sealed chamber containing an A.C. induction motor connected to and driving a flywheel, the A.C. induction motor being energizable with the high frequency A.C. potential from the auxiliary generator whereby it will be caused to rotate at a much higher RPM than the main generator, whereby large amounts of kinetic energy can be stored in the A.C. motor and flywheel, windage losses of the A.C. induction motor being low due to the low windage properties of selected atmosphere in the sealed chamber, and, when the electrical power to the drive means is interrupted the A.C. induction motor can function as a generator by converting the stored rotational kinetic energy into high frequency A.C. potential which can be supplied to the auxiliary generator to cause it to function as a motor to drive the main generator when the drive means fails, and (d) control means for the interconnecting the rotatable A.C. generator, the drive means, and the A.C. induction motor the control means being responsive to the operativeness of the drive means, to convey under selected conditions high frequency A.C. potential from the auxiliary generator during normal operation of the rotatable A.C. generators so as to bring the A.C. induction motor and its flywheel up to the selected high speed, and to maintain their rotation at such high speed, and, upon failure of the electrical power from the external source to the drive means, the control means disconnects the circuit to the external source and the A.C. induction motor will function as a generator of high frequency A.C. potential by converting the rotational kinetic energy therein and supplies it to the auxiliary A.C. generator to cause it to operate as a motor to drive the main A.C. generator and keep its speed in the given RPM range for an extremely long period of time so that the main generator will generate substantially constant frequency, substantially constant voltage A.C. potential output without any interruption, and upon resumption of electrical power from the external source, the control means reconnects the circuit to enable operation of the drive means so that the main A.C. generator and the auxiliary A.C. generators will again operate normally, with the auxiliary generator then supplying high frequency A.C. potential to the A.C. induction motor to bring it up to selected high speed to recover its rotational kinetic energy.

* * * * *